(12) United States Patent
Nelson et al.

(10) Patent No.: US 6,856,713 B2
(45) Date of Patent: Feb. 15, 2005

(54) OPTICAL COMPONENT AND METHOD OF MAKING THE SAME

(75) Inventors: Gary W. Nelson, Glendale, AZ (US); Valery Khalilov, St. Petersburg (RU)

(73) Assignee: Polymicro Technologies, LLC, Phoenix, AZ (US)

( * ) Notice: Subject to any disclaimer, the term of this patent is extended or adjusted under 35 U.S.C. 154(b) by 224 days.

(21) Appl. No.: 10/137,345

(22) Filed: May 3, 2002

(65) Prior Publication Data
US 2003/0044144 A1 Mar. 6, 2003

Related U.S. Application Data

(60) Provisional application No. 60/313,029, filed on Aug. 20, 2001.

(51) Int. Cl.[7] .............................. G02B 6/16; G02B 6/04; C03B 37/23
(52) U.S. Cl. ........................ 385/12; 385/142; 385/144; 385/115; 35/435
(58) Field of Search ........................ 385/115, 123–128, 385/141, 142, 144, 145; 65/385, 397, 435, 424, 30.1, 32.1

(56) References Cited

U.S. PATENT DOCUMENTS

| 5,267,343 A | 11/1993 | Lyons et al. | |
|---|---|---|---|
| 5,574,820 A | 11/1996 | Griscom | |
| 5,901,264 A | * 5/1999 | Camlibel et al. | 385/128 |
| 5,983,673 A | 11/1999 | Urano et al. | |
| 6,220,059 B1 | * 4/2001 | Klein et al. | 65/394 |
| 6,289,161 B1 | * 9/2001 | Schotz et al. | 385/142 |
| 2002/0194869 A1 | * 12/2002 | Borrelli et al. | 65/17.4 |

FOREIGN PATENT DOCUMENTS

| DE | 195 47 904 A1 | 12/1995 |
|---|---|---|
| EP | 0879799 A2 | 11/1998 |
| EP | 0943936 A2 | 9/1999 |

* cited by examiner

*Primary Examiner*—Akm Enayet Ullah
*Assistant Examiner*—Sarah U Song
(74) *Attorney, Agent, or Firm*—Pillsbury Winthrop LLP

(57) ABSTRACT

An optical component and a method of making the same are provided. In one embodiment, the optical component is a low-OH optical fiber that includes a core and a cladding. The optical component is treated by immersion in a hydrogen gas atmosphere at a predetermined pressure, at a predetermined temperature and for a predetermined time period such that intrinsic and impurity defects of the optical component are destroyed. The method of making the optical component includes providing a preform having a content of OH-groups in the amount of about 0.1 to about 10.0 ppm and a content of chlorine in the amount of 0 to about 1000 ppm and drawing the preform to elongate it to form an optical component from the preform. The optical component is immersed in a hydrogen gas atmosphere at a predetermined pressure, at a predetermined temperature and for a predetermined time period that is sufficient to destroy intrinsic and impurity defects of the optical component.

21 Claims, 11 Drawing Sheets

OPTICAL COMPONENT AND METHOD OF MAKING THE SAME

This application claims priority from U.S. Provisional Application No. 60/313,029, which was filed on Aug. 20, 2001, the content of which is incorporated in its entirety.

BACKGROUND OF THE INVENTION

1. Field of the Invention

The present invention relates generally to optical fibers with core of high purity silica and fluorine doped silica cladding and optical components based on such fibers. More particularly, the present invention relates to a method of producing such optical fibers and optical components.

2. Description of Related Art

One kind of optical fiber is a step-index optical fiber. The core material of such fibers is generally classified as low or high OH silica. The optical losses of high OH fibers is mainly restricted in ultraviolet (UV) region by light scattering (Rayleigh scattering) losses, whereas the optical losses of low OH fibers are mainly restricted by absorption losses in the UV region. The absorption losses in the UV region in low OH fibers are determined by the intensive absorption bands of the intrinsic and impurity defects. Generally, such defects in glass absorb UV rays at absorption bands of 163 nanometers, 210 nanometers, 248 nanometers, 260 nanometers and 340 nanometers. High optical transmission of low OH fibers in the near infrared (NIR) region is determined by the traces of OH absorption bands. The OH content determines the low NIR transmission for the high OH fiber, e.g., fibers with OH content in the 400 to 1200 ppm range. Thus, fibers with high OH are mainly used for applications in the UV and visible (VIS) spectral regions and fibers with low OH are mainly used for applications in the VIS and NIR spectral regions.

The core glass of standard low OH preforms and fibers may typically contain up to 1000 ppm of chlorine in different forms. Because of the existence of numerous intrinsic defects and radiation centers, the low OH fibers are considered to have little or no use in the UV spectral region.

Generally, methods for improving radiation resistance and UV transmission of optical fibers are known. In such methods, the improvement is achieved (a) by increasing the concentration of dissolved hydrogen in the core with or without pre-irradiation by UV or Gamma radiation and (b) by manufacturing the glass core with special glass compositions. Such methods are usually realized using high OH fiber as the base material.

SUMMARY OF THE INVENTION

One aspect of the present invention is to provide an optical component comprising a core and a cladding, wherein the cladding surrounds the core and has an index of refraction that is lower than an index of refraction of the core. The core includes a high-purity silica glass that contains OH-groups in the amount of about 0.1 to about 10.0 ppm and chlorine in the amount of 0 to about 1000 ppm. The cladding includes a high-purity silica glass that contains fluorine. The optical component is treated by immersion in a hydrogen gas atmosphere at a predetermined pressure, at a predetermined temperature and for a predetermined time period such that intrinsic and impurity defects are destroyed.

Another aspect of the present invention is to provide optical fibers with practically theoretical losses in the UV spectral region.

Another aspect of the present invention is to provide optical fibers, which have low optical losses over a wide spectral region from UV to NIR (180 nanometers to 2200 nanometers).

Another aspect of the present invention is to provide optical fibers with high radiation resistance in the UV, VIS and NIR spectral ranges.

Another aspect of the present invention is to provide a practical and economical manufacturing process for the fibers from commercially available low OH optical preforms with OH-content less than 10 ppm and Chlorine content about 1000 ppm or less.

Another aspect of the present invention is to provide a method of making an optical component. The method comprises providing a preform having a content of OH-groups in the amount of about 0.1 to about 10.0 ppm and a content of chlorine in the amount of 0 to about 1000 ppm and drawing the preform to elongate it to form an optical component from the preform. The optical component is immersed in a hydrogen gas atmosphere at a predetermined pressure and at a predetermined temperature and for a predetermined time period that is sufficient to destroy intrinsic and impurity defects of the optical component.

In one embodiment, the method comprises drawing high strength optical fibers and coating the fibers with a high temperature polymer like polyimide. The optical fiber core comprises high-purity silica glass, which contains OH-groups in the amount of 0.1–10.0 ppm and with chlorine content less than 1000 ppm. The optical fiber cladding comprises high purity silica glass containing fluorine. The fiber is immersed in a hydrogen gas atmosphere at pressures of hydrogen gas from 10 atmospheres up to 200 atmospheres and with temperatures from 200° C. to 450° C., for example. The process of hydrogen immersion at temperature is performed over a sufficient time to destroy all or most of the intrinsic and impurity defects.

Other objects, features and advantages of the present invention will become apparent from the following detailed description, the accompanying drawings, and the appended claims.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION OF EMBODIMENTS OF THE INVENTION

Figure 1:
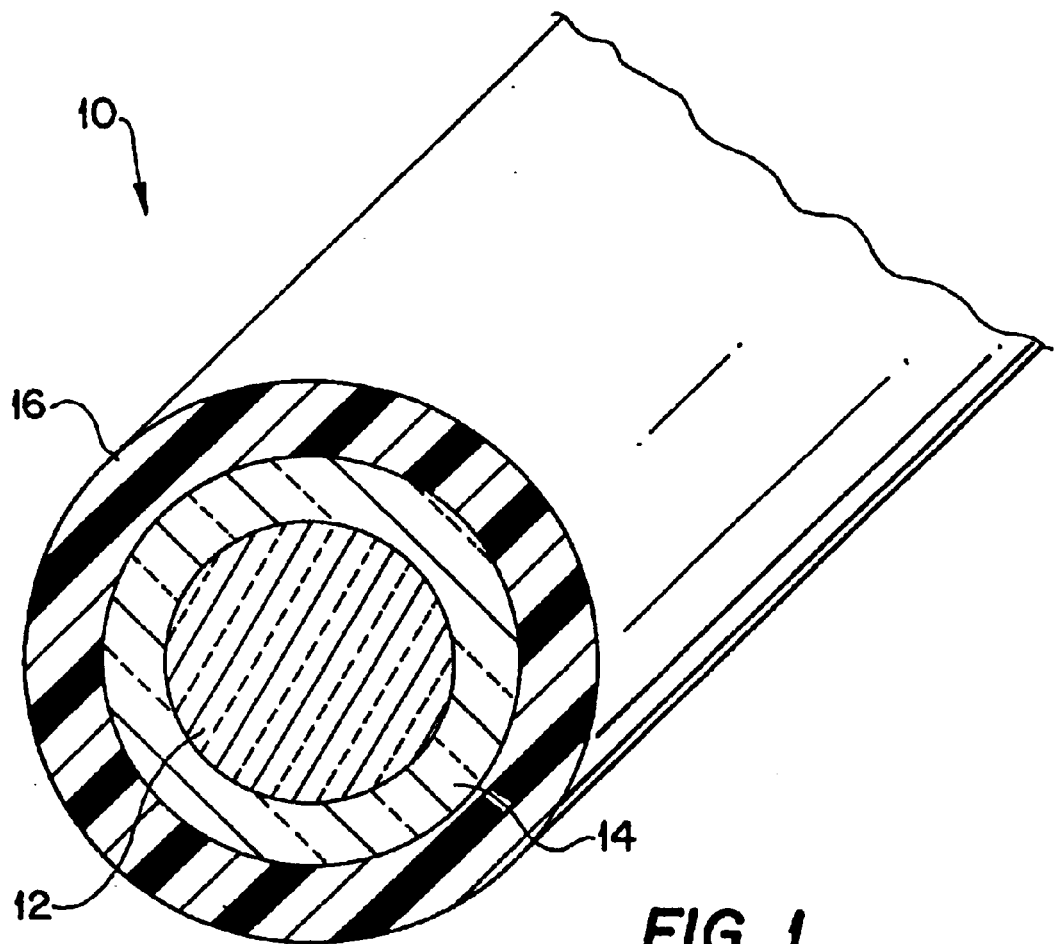
FIG. 1 is a perspective view of an optical component manufactured in accordance with the principles of the present invention.
Figure 2:
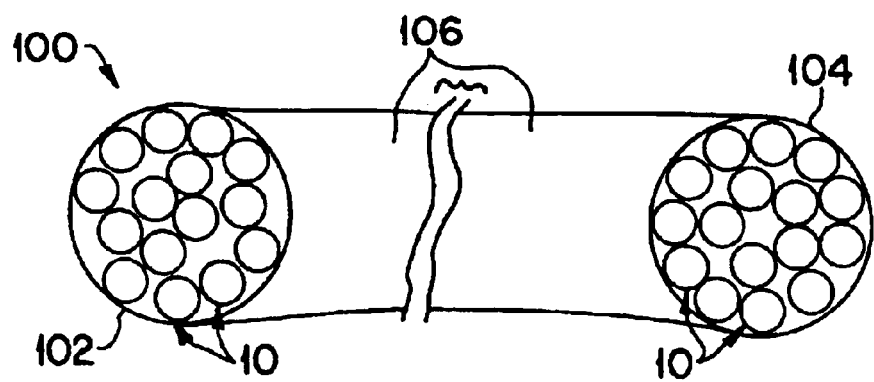
FIG. 2 is a perspective view of an optical component comprising a plurality of optical fibers shown in FIG. 1.

FIG. 1 is a perspective view of an optical component manufactured in accordance with the principles of the present invention. The optical component contemplated herein can be a single optical fiber, generally indicated at 10, as shown in FIG. 1. Alternatively, the optical component 10 can be a plurality of individual fibers 10 bundled together into a fiber bundle, generally indicated at 100 (FIG. 2).

FIG. 1 shows a single optical fiber 10 that includes a core 12, a cladding layer 14 and an optional protective layer 16. The optical fiber 10 is a filament of transparent dielectric material that guides light using total internal reflection. The cylindrical core 12 is surrounded by, and is in intimate contact with, the cladding 14 of similar geometry. The optical fiber 10 may be of any cross-sectional shape, for example, circular.

Such structure allows the core 12 to carry optical information and allows the cladding 14 to provide an optical boundary, reflecting all signals back to the core 12. This reflection is accomplished by the cladding 14 having a refractive index that is slightly lower than the refractive index of the core 12 so that light can be guided by the optical fiber 10 in accordance with Snell's law.

The core 12 of the optical fiber 10 includes a high-purity silica glass which contains OH-groups in the amount of about 0.1 to about 10.0 ppm and chlorine in the amount of 0 to about 1000 ppm. The optical component 10 is treated by immersion in a hydrogen gas atmosphere at a predetermined pressure, at a predetermined temperature and for a predetermined time period such that intrinsic and impurity defects are destroyed. By providing the core 12 with the above-described proportions of OH-groups and chlorine and treating the same, the core 12 allows the optical fiber 10 to exhibit minimal optical losses in the UV, VIS and NIR spectral regions. Further, the core 12 allows the fiber 10 to be highly resistant to optical damage through UV and gamma radiation, as will be described in further detail below.

The fiber 10 can be manufactured to be any length. For example, the length of the fiber 10 can be manufactured to be on the order of kilometers (km), such as 1 to 10 kilometers. In UV applications, for example, the fiber 10 may have a length of 1–3 meters. The fiber 10 can be manufactured to be any diameter as well, for example, a diameter in the range of about 100 to about 1000 microns.

The cladding 14 is constructed so to surround the core 12 and includes a high-purity silica glass that contains fluorine. Adding fluorine to silica glass may reduce the formation of radiation centers, such as the E' center and the non-bridging oxygen hole center (NBOHC), in silica glass. Thus, the cladding 14 improves the radiation resistance of the optical fiber 10.

The optional protective layer 16 may be, for example, a layer of polymer coatings, braided fiber, or cable jacketing, that is provided around the cladding 14 to protect the fiber 10 and to improve the mechanical strength of the fiber 10. The optional protective layer 16 can be provided to protect the fiber 10 from temperature or to increase the tolerance of the fiber 10 to certain chemicals or compounds found in certain environments in which the fiber 10 may be used. The optional protective layer 16 may be referred to as a "buffer" and can include polyimides, acrylates, silicones, fluoropolymers and aluminum, as well as other protective or strengthening materials.

FIG. 2 shows the fiber bundle 100, which is an alternative embodiment of the optical fiber 10, comprising a plurality of single optical fibers 10 bundled together. In other words, a plurality of the cores 12 and respective claddings 14 surrounding each core 12 cooperate to form the fiber bundle 100. The fiber bundle 100 normally has a number of single fibers 10, which can be adhered or bonded to one another by an appropriate means, for example, adhesives or bonding material. The fibers 10 can be adhered to one another at a light output end 102, at a light input end 104 or at both ends 102, 104 of the fiber bundle 100. This structure allows for the fibers 10 to be separate throughout an intermediate portion 106 of the fiber bundle 100, thereby allowing the fiber bundle 100 to be sufficiently flexible as a whole.

While the specific number and arrangement of the fibers 10 in the fiber bundle 100 is appropriately determined according to its intended application or desired use, a representative fiber bundle 100 could contain about 2 to about 100 fibers of 1–3 meters in length, for example.

The fiber 10 and the fiber bundle 100 exhibit optical losses in the UV region that approach theoretical losses, low optical losses in the NIR region and high radiation resistance to UV and gamma radiation.

As such, optical components, e.g., the single optical fiber 10 and the fiber bundle 100, generally have applications in various fields including communication, image transmission and energy transmission. Such optical components can be used in markets such as medicine, astronomy, process control, spectroscopy and others where ultraviolet (UV) or broadband energy, e.g., UV, visible (VIS) or infrared (IR), is required. The fiber 10 and the fiber bundle 100 can be used over a wide spectral region, for example, from 180 nanometers to 2200 nanometers.

Figure 3:
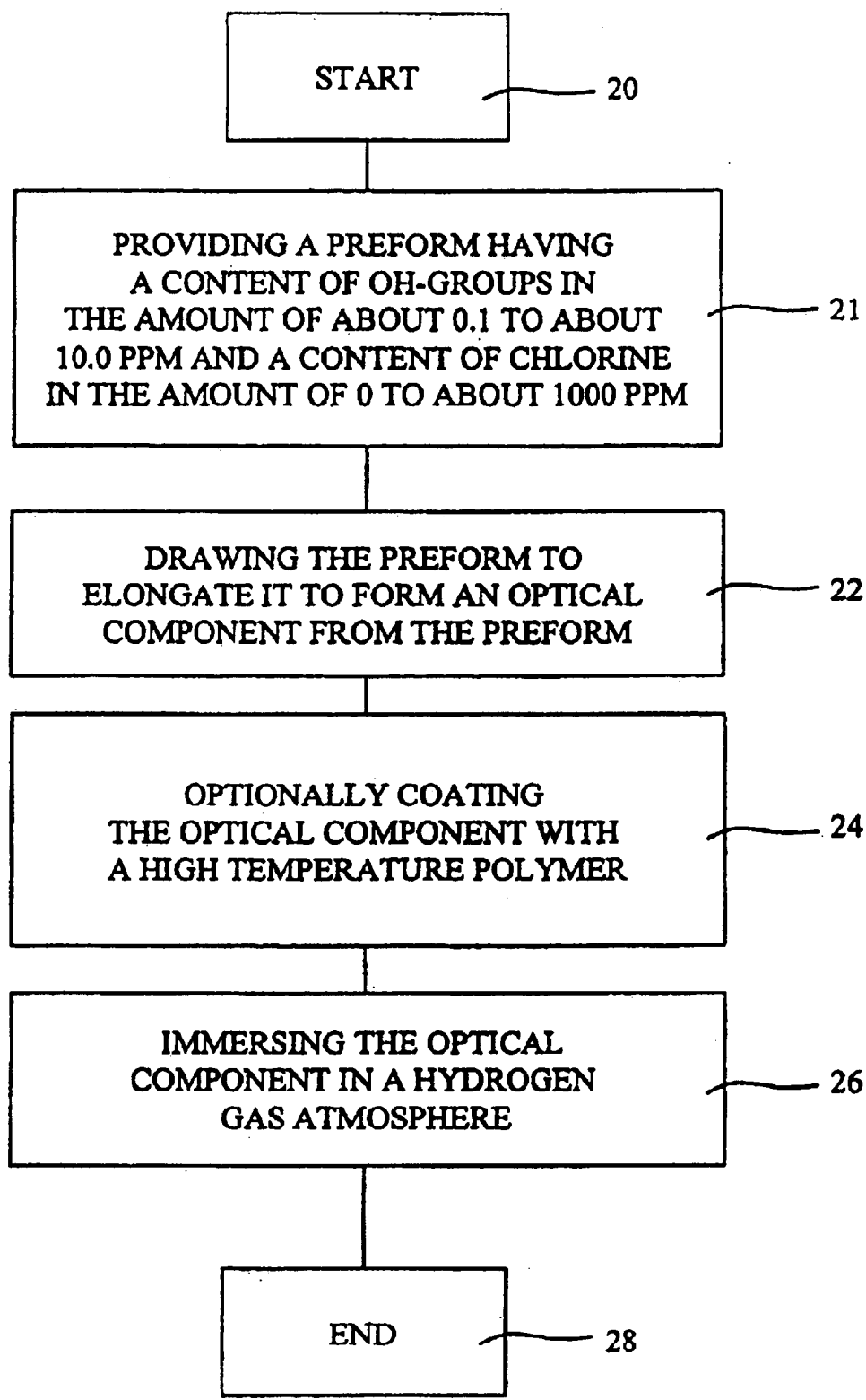
FIG. 3 is a flow chart illustrating an example of a method in accordance with the principles of the present invention.

FIG. 3 shows a method of making an optical component in accordance with a method of the present invention. The method starts at 20. At 21, a preform having a content of OH-groups in the amount of about 0.1 to about 10.0 ppm and a content of chlorine in the amount of 0 to about 1000 ppm is provided. At 22, the preform is drawn to elongate it to form an optical component, such as an optical fiber, from the preform.

At 24, the optical component can be optionally coated with a high temperature polymer, such as polyimide, to provide strength and flexibility to the component. The coating may be applied at any time during the method, for example, prior to, during or after heat treatment, for example. At 26, the optical component is immersed in a hydrogen gas atmosphere having a predetermined pressure and a predetermined temperature for a predetermined time period sufficient to destroy intrinsic and impurity defects of the optical component.

The high temperature polymer or other high temperature hydrogen penetrable coatings allow variable temperatures and pressures to be produced within the hydrogen gas atmosphere, for example, temperatures ranging from about 200 to about 450 degrees Celsius and pressures ranging from about 10 to about 200 atmospheres. Such variable temperatures and pressures allow the hydrogen in the hydrogen gas atmosphere to completely interact with intrinsic defects of the component over a predetermined period of time for a given component diameter, such as an optical fiber diameter, for example. The method ends at 28.

In low OH and high OH fiber that is coated with a polymer buffer coating, the hydrogen treatment temperature is generally not raised higher than the temperature of degradation of the polymer buffer coating without damaging the fiber strength. Accordingly, by using high temperature polyimide buffers or other high-temperature hydrogen-penetrable coatings, temperatures of hydrogen treatment and pressures where hydrogen can completely interact with the intrinsic defects over a defined period of time for the given fiber diameter can be obtained in accordance with the above described method.

For example, the hydrogen treatment region for optical fibers where the interaction of the intrinsic defects with hydrogen is effective and the degradation of polyimide buffer is not meaningful is generally in 200–450° C. range with the hydrogen pressure from 10 atmospheres up to 200 atmospheres. For this process, some of the hydrogen does not interact with intrinsic defects of the fiber, but rather stays in the fiber in dissolved form. The concentration of the dissolved part of hydrogen molecules is about $10^{18}$–$10^{19}$ mol/cm$^3$. The dissolved hydrogen prevents the forming of additional radiation centers, the same as those seen in high OH fibers. All or a majority of radiation centers can be passivated by the hydrogen treatment method of the invention.

The method results in optical components that exhibit optical losses in the UV region that approaches theoretical losses, low optical losses in the NIR region and high radiation resistance to UV and gamma radiation. This method also results in optical components, e.g., optical fibers, which are usable over the wide spectral region from 180 nanometers to 2200 nanometers.

In one embodiment, the optical component is an optical fiber. The predetermined pressure of the hydrogen gas atmosphere is about 10 to about 200 atmospheres and the predetermined temperature of the hydrogen gas atmosphere is about 200 to about 450 degrees Celsius. The predetermined time period that the fiber is immersed in the hydrogen gas atmosphere is a function of the fiber's diameter. This function can be represented by the core's diameter being 200*(x) microns ($\mu$m) and the predetermined time period being 5*(x) hours, wherein x represents a numerical value greater than 1.

One particular example incorporating this function can be shown when the predetermined pressure of the hydrogen gas atmosphere is 40 atmospheres and the predetermined temperature of the hydrogen gas atmosphere is 350 degrees Celsius. In this example, a core having a diameter of 200 microns would be immersed in the hydrogen gas atmosphere for 5 hours of treatment. Likewise, in other examples, a core having a diameter of 400 microns would be immersed in the hydrogen gas atmosphere for 10 hours of treatment and a core having a diameter of 600 microns would be immersed in the hydrogen gas atmosphere for 15 hours of treatment.

After being immersed in the hydrogen gas atmosphere, the optical component exhibits a stable high radiation resistance to UV and gamma radiation in the UV, VIS and NIR spectral regions. The component also can be useful in the UV, VIS and IR spectral regions with minimal optical losses.

Many optical components can be manufactured using the method described above and illustrated in FIG. 3. Such optical components can be useful in UV and NIR transmission with minimal losses in the UV spectral region. For example, such optical components could include an optical fiber, an optical fiber probe or an optical fiber bundle comprising a plurality of single optical fibers, for example. The above described method can be used to manufacture other optical components as well, such as uncoated optical components. Such uncoated optical components might be subjected to higher temperatures due to their lack of a polymer buffer layer, for example.

An optical fiber manufactured in accordance with the principles of the above-described method comprises a core including a high-purity silica glass which contains OH-groups in the amount of about 0.1– about 10.0 ppm and chlorine in the amount of 0 to about 1000 ppm and a cladding including a high-purity silica glass which contains fluorine. Thus, the method illustrated in FIG. 3 can be used to produce the single fiber 10 or the fiber bundle 100 in accordance with the principles of the present invention.

Now will be described technical background and technical examples, which will help to better understand the method described above and shown in FIG. 3.

UV or gamma rays can adversely affect the attenuation of optical fibers. Radiation resistance (solar-resistance and gamma resistance) of the high OH optical fiber is determined by the presence of strained-bonds $\equiv$Si—O—Si$\equiv$. The concentration of these strained-bonds depends on the Fictive temperature $T_f$ of the glass structures of the fibers. The breaking of the silica oxygen bonds $\equiv$Si—O—Si$\equiv$ under UV or gamma radiation leads to the appearance of non-bridging oxygen hole centers $\equiv$Si—O° (NBOH-center) and E'$_1$ centers of the form $\equiv$Si$^{108}$ with corresponding absorption bands at 260 nanometers and 210 nanometers, respectively.

The presence of dissolved hydrogen in the glass matrix is a distinctive feature of the manufacturing process for high OH glasses. The concentration of dissolved hydrogen is one main factor in determining the high radiation resistance of high OH silica glasses as shown by the following reaction (1):

$$\equiv Si—O—Si\equiv + H_2 + \text{irradiation}(UV, \gamma) \rightarrow \equiv Si—OH + H—Si\equiv \quad (1)$$

The loss of dissolved hydrogen from the glass fiber causes the decreasing radiation resistance of high OH optical fibers after drawing versus radiation resistance of bulk preform material. As evident from equation (1), increasing the radiation resistance of high OH optical fibers can be accomplished by increasing the concentration of dissolved hydrogen in such fibers.

However, the molecular structure in low OH fibers (OH-group concentration less than 10 ppm) is very different. The specific intrinsic defects in low OH glasses are as follows: $\equiv$Si—Si$\equiv$, which represents an oxygen vacancy, $\equiv$Si—O—O—Si$\equiv$, which represents a peroxy linkage and $\equiv$Si—Cl and $\equiv$Si—Cl—Cl—Si$\equiv$ and $\equiv$Si$^+$ Cl$^-$, which each represent a chlorine impurity defect.

The presence of dissolved $Cl_2$; $Cl_0$ is a specific characteristic of "low-OH" glasses. The following absorption bands are similar to radiation centers that appear during the drawing of low OH optical fibers: $\equiv$Si$^\cdot$ (E$'_1$ center), $\equiv$Si—O$^\circ$ (NBOH-center) and $\equiv$Si$^+$ Cl$^-$ (T$_3^+$ center). These intrinsic defects and radiation centers result in the following absorption bands being formed for low OH optical fibers: 163 nanometers (T$_3^+$ center); 210 nanometers (E$'_1$ center); 248 nanometers (Oxygen vacancy); 340 nanometers (Cl$_2$-molecule); 260 nanometers (NBOH-center); and 640 nanometers (NBOH-center).

Due to the numerous intrinsic absorption bands in the UV region, the low OH fibers are generally used in the VIS and NIR up to 2200 nanometer regions. Performance of low OH fibers in the NIR is determined mainly by the trace OH groups in the particular low OH fiber.

The presence of hydrogen in dissolved form, as in the high OH fiber case, is not enough to provide superior radiation resistance in low OH fibers, whereas the presence of hydrogen in dissolved form in high OH fibers is sufficient to increase the radiation resistance. For low OH fibers, the main source of radiation centers are intrinsic defects (which hydrogen cannot neutralize at low temperatures), which need to be neutralized to provide sufficient radiation resistance for the fiber. Such intrinsic defects are absent in high OH fibers, hence why high OH fibers have been used in the UV region.

Hydrogen reacts with intrinsic and impurity defects in low OH glasses having different chlorine concentrations. In such fibers, the centers of type $\equiv$Si—Cl and $\equiv$Si$^+$ Cl$^-$ are one of the main sources of the formation of E$'_1$ centers of low OH high purity silica glass. Generally, preforms for drawing low OH optical fibers have a chlorine content in the core up to 1000 ppm. One example of such a preform is manufactured by Heraeus as Fluosil® Fiber Optic Preform "SWU-type".

For low chlorine content, high-purity low OH silica glass, the intrinsic defects mostly develop in the forms of $\equiv$Si—Si$\equiv$ and $\equiv$Si—O—O—Si$\equiv$. With hydrogen treatment up to 200° C., the hydrogen in low OH glass weakly interacts with the intrinsic defects and mainly exists in a dissolved form. In previous methods, fibers with silica glass cores were irradiated together with hydrogen treatment to initiate the intrinsic defects into a form, which easily interacted with hydrogen at low temperatures. However, when the temperature of hydrogen treatment raises above 200° C. the interaction of hydrogen with oxygen vacancies and peroxy linkages becomes noticeable.

With silica glass or optical fiber preforms, temperatures that are lower than the silica deformation temperature (1250° C.) and pressures where the reaction between the intrinsic defects and the hydrogen proceeds almost completely can be obtained.

Dissolved chlorine exists in low OH fiber in the form of $Cl_2$ molecules with an absorption band at 340 nm—a distinctive characteristic that $Cl_2$ molecules exist in such fibers. The hydrogen treatment per this invention forms the reaction (2a):

   (2a)

Where the absorption band at 340 nm disappears completely. As discussed above, the chlorine content in the core of low-OH preforms for optical fibers (e.g., Heraeus SWU-type) can reach 1000 ppm. Most chlorine exists in the form of defect centers of the type: $\equiv$Si—Cl; $\equiv$Si—Cl Cl—Si$\equiv$; $\equiv$Si$^+$ Cl$^-$. These defect center types mostly determine the character and intensity of the radiation centers. One problem that develops is that if the hydrogen treatment leads to an increase of the radiation resistance in low OH preforms with lower chlorine content (less than 100 ppm), the hydrogen treatment of SW-type preforms sharply increases the formation of E$_1$' centers and catastrophically reduces the radiation resistance of the fiber because during irradiation, the hydrogen presence in SWU-preforms initiates the following reaction (2):

   (2)

The presence of this chemical process is confirmed by the increasing of the vibration absorption band of HCl molecules at 2800 cm$^{-1}$. The band at 2800 cm$^{-1}$ sharply increases only when SWU-type preforms are irradiated after hydrogen treatment.

However, in optical fibers with high chlorine-content drawn from low OH preforms of SWU-type, for example, the $\equiv$Si—Cl centers are mostly transformed into $\equiv$Si$^+$ Cl$^-$ type of centers. In contrast, when such fibers are subjected to the hydrogen treatment of the method described above and shown in FIG. 3, at the predetermined pressures, temperatures and times described above, the following reaction (3) occurs:

   (3)

Consequently, the irradiation of the optical component or fiber produced by the method shown in FIG. 3 does not result in the sharp rise of E$_1$' centers, as in the reaction (2) above. So the reaction (2) applies to the specific reaction for the bulk silica glass with noticeable chlorine content, while at the same time, the reaction (3) applies to optical fiber cores made from high-purity silica glass with high chlorine-content. Thus, the method shown in FIG. 3 and described above provides advantages over previous methods of forming optical components, such as low OH optical fibers.

Figure 4:
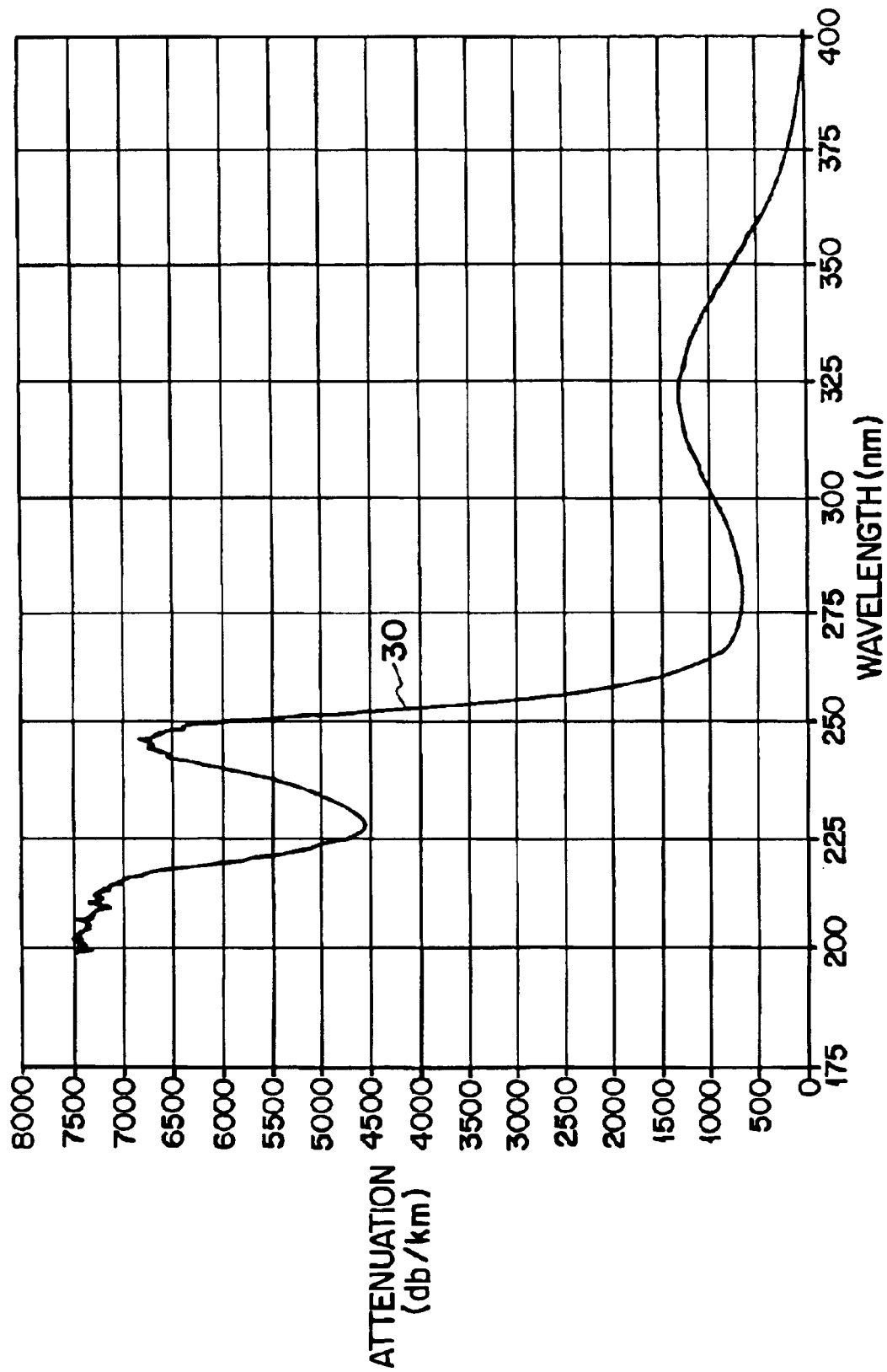
FIG. 4 is a graphical representation of spectral attenuation in an optical fiber with OH content of about 0.1 ppm.

FIGS. 4–8 show various technical examples to help better understand the above described fiber 10 shown in FIG. 1 and the above described method shown in FIG. 3. In particular, FIG. 4 shows a spectral attenuation of an initial fiber with OH content of about 0.1 ppm. The initial fiber can be considered a conventional low OH fiber for this example and may be a commercially available, for example. The graph shows attenuation on a scale ranging from 0 to 8000 decibels (dBs) per kilometer (km). The wavelength, as measured from 175 to 400 nanometers, is representative of the UV spectral region. As graphically illustrated, the attenuation versus wavelength curve, generally indicated at 30, shows peaks at wavelengths of about 210, 243 and 325 nanometers and attenuation of 7300, 6750 and 1300 dB/km, respectively. This representation shows attenuation generally decreases through the UV spectral region, as wavelength approaches the VIS spectrum, but the decrease is not uniform.

Figure 5:
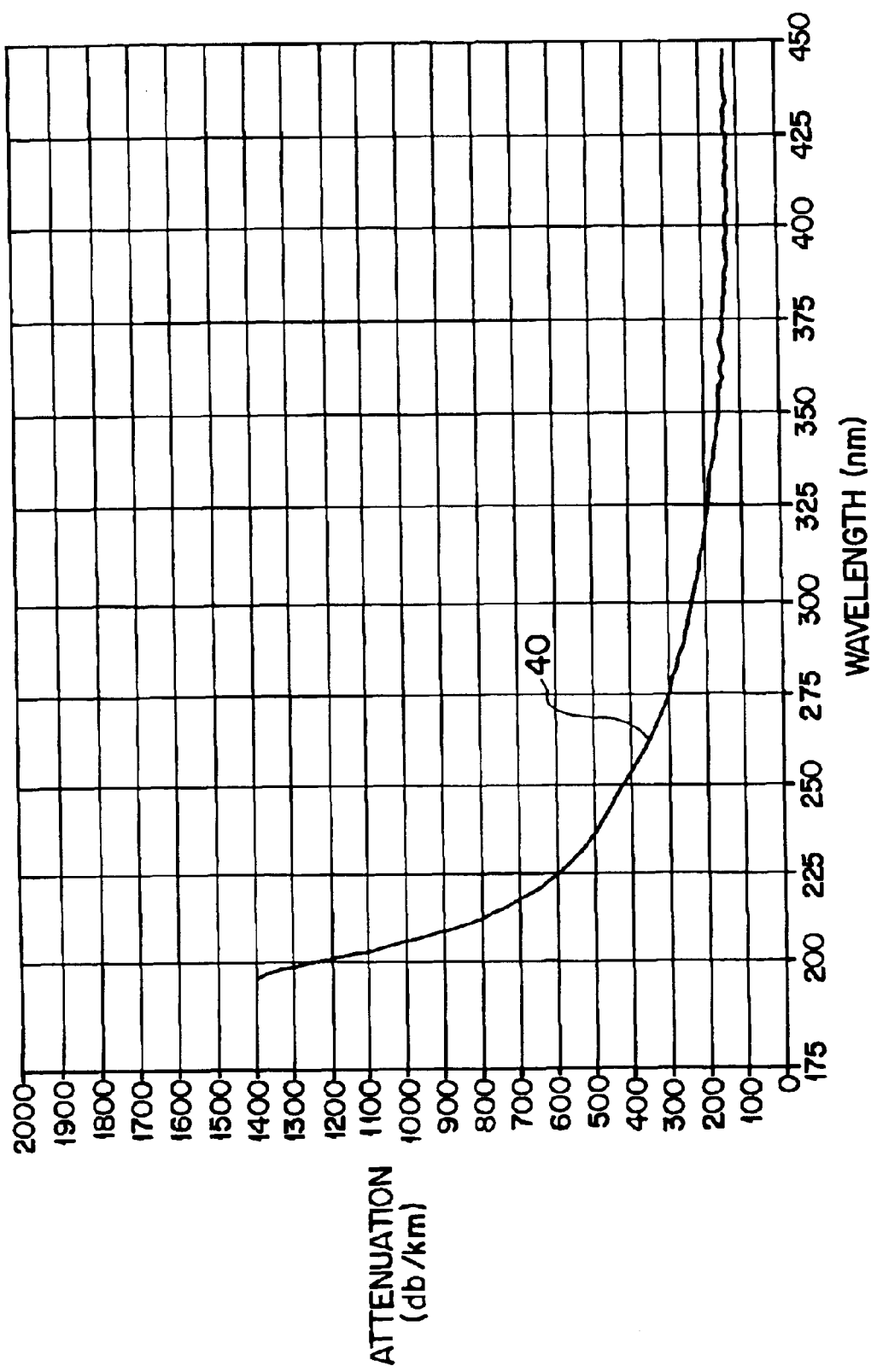
FIG. 5 is a graphical representation of spectral attenuation in an optical fiber manufactured in accordance with the method of FIG. 3.

By manufacturing an optical fiber in accordance with the principles of the present invention, the optical fiber can significantly reduce attenuation in the UV spectral region. For example, FIG. 5 shows a spectral attenuation of an optical fiber manufactured using the method of FIG. 3. Particularly, the optical fiber was immersed in a hydrogen gas atmosphere for 5 hours in which the pressure was 40 atmospheres and in which the temperature was 350 degrees Celsius. These specific configurations represent just one embodiment of the method of FIG. 3. FIG. 5 shows the attenuation measured on a scale measured from 0 to 2000 dB per km. The wavelength, as in FIG. 1, is measured from 175 to 400 nanometers, and is representative of the UV spectral region.

As graphically illustrated, the attenuation versus wavelength curve, generally indicated at 40, is somewhat exponential. An initial attenuation of about 1400 dB/km is shown at a wavelength of about 190 nanometers. The attenuation versus wavelength curve shows attenuation significantly decreasing from about 1400 dB/km to about 200 dB/km through wavelengths ranging from 190 to 325 nanometers. As is clear from a comparison between FIGS. 4 and 5, the optical fiber 10 according to the present invention exhibits greatly reduced optical losses in the UV spectral region.

FIGS. 6, 7, 8, 12, and 13 show solarization measurements for an optical fiber manufactured in accordance with the method of the present invention. FIGS. 6, 8, 12 and 13 show testing results performed using a Fiber Optic Spectrometer (FOS), as measured in counts ranging from 0 to $3.5 \times 10^3$, and graphed dependent upon wavelength, as measured from 175 to 450 nanometers (nm). The fiber was irradiated using a deuterium lamp having a constant output and an output power of 200 nW/nm at a wavelength of 214 nanometers. The deuterium lamp can be constant and can have an output power that varies depending on the diameter of the core fiber. For example, the output of the deuterium lamp may have power of 450 nW/nm at a wavelength of 214 nanometers for a 300 um core fiber, power of 200 nW/nm at a wavelength of 214 nanometers for a 200 um core fiber and power of 70 nW/nm at a wavelength of 214 nanometers for a 100 um core fiber.

Figure 6:
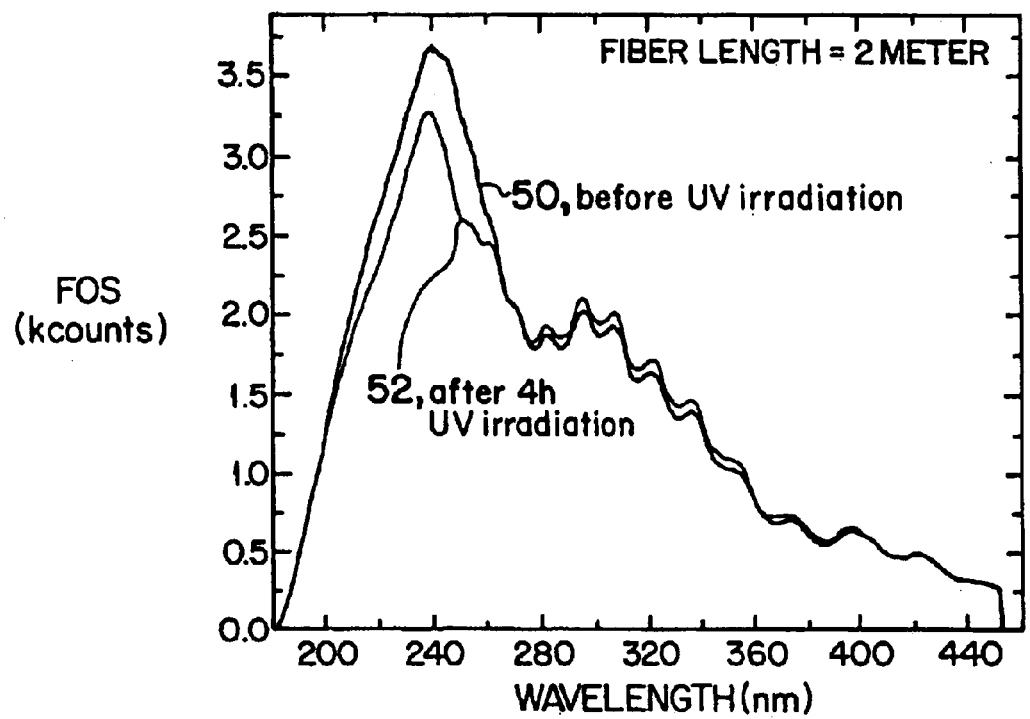
FIG. 6 is a graphical representation of solarization measurements in an optical fiber manufactured in accordance with the method of FIG. 3.
Figure 7:
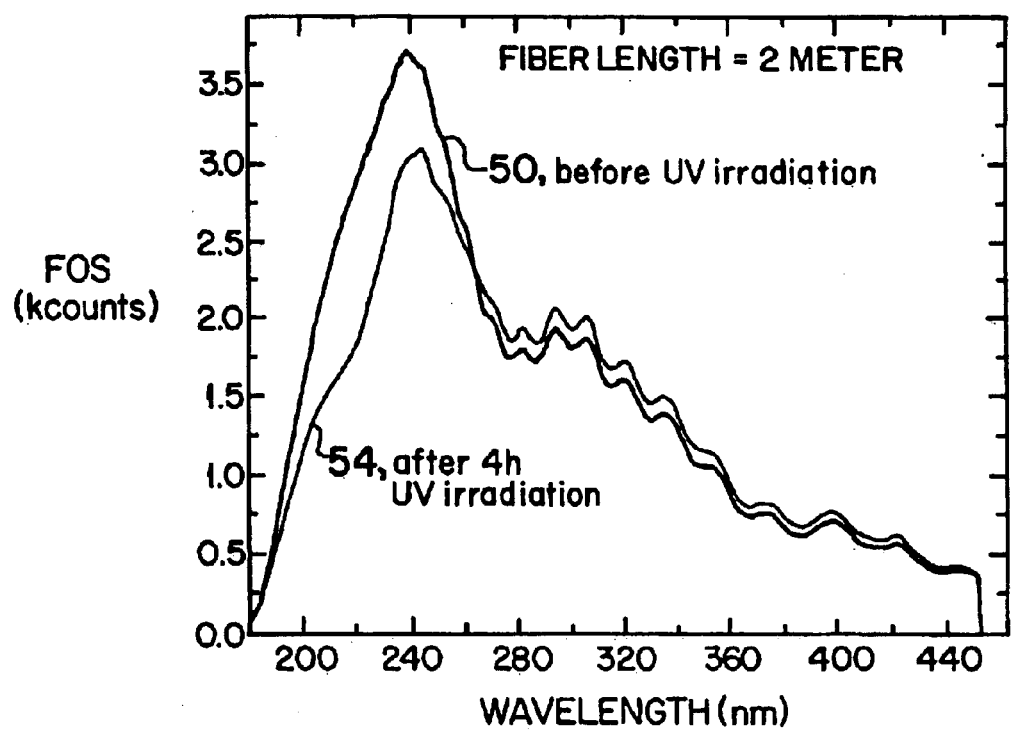
FIG. 7 is a graphical representation of solarization measurements in an optical fiber and manufactured in accordance with the method of FIG. 3 and thermally treated.
Figure 12:
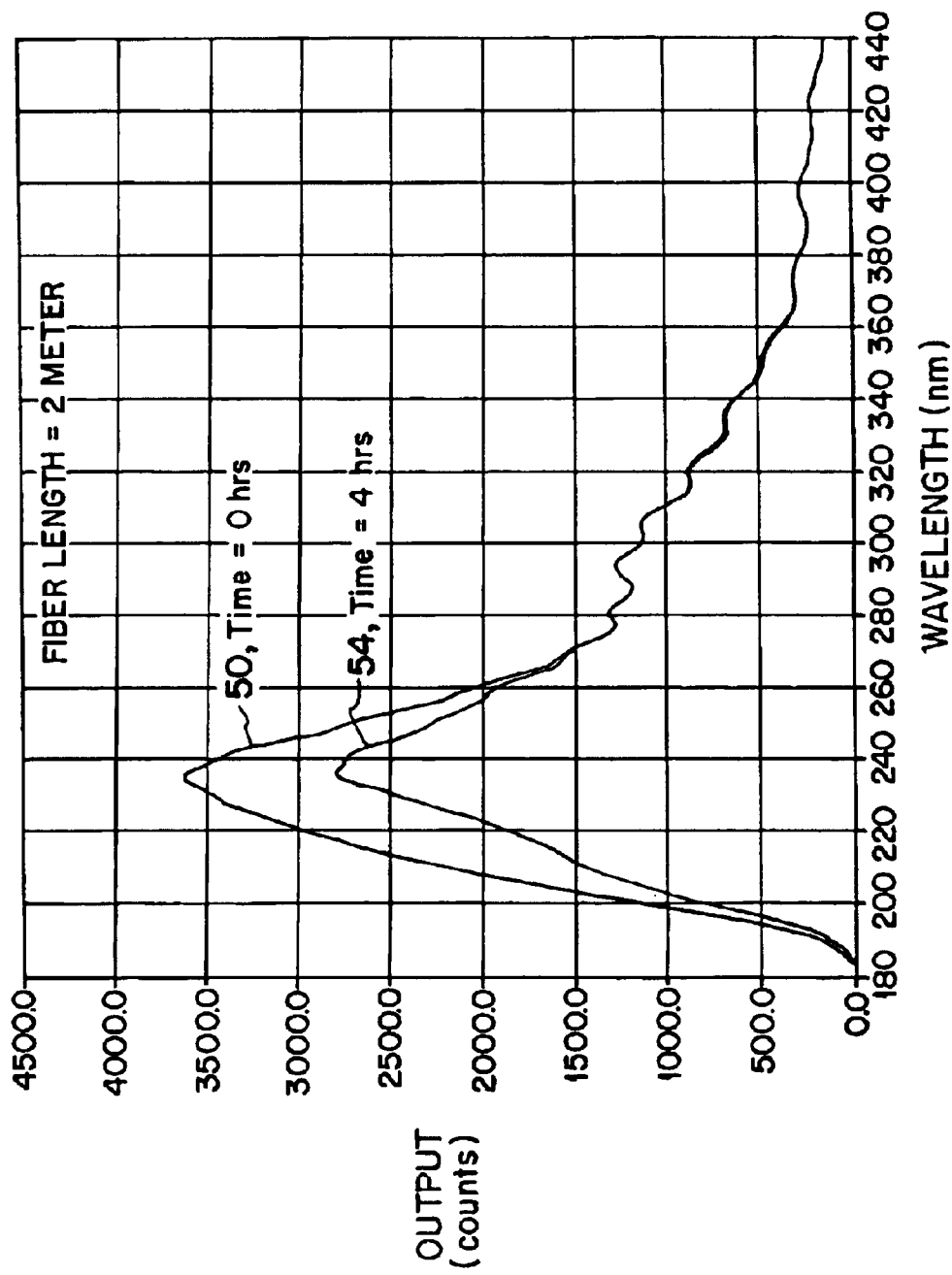
FIG. 12 is a graphical representation of solarization measurements in an optical fiber manufactured in accordance with the method of FIG. 3 after one year two months after manufacture.

In FIGS. 6, 7, and 12 the solarization measurements of embodiments of the present invention before UV irradiation are represented by line 50. In FIG. 6, the solarization measurements after 4 hours of UV irradiation are represented by line 52 and are representative of the optical fiber having a transmittance of at least 90% in the wavelength range of 240 to 400 nanometers. The fiber was not thermally treated for the time degradation test.

FIG. 7 shows solarization measurements after the fiber was thermally treated at 100 degrees Celsius for 100 hours and after such treatment irradiated with the Deuterium lamp. Thus, in FIG. 7, the solarization measurements after 4 hours of UV irradiation are represented by line 54. Line 54 shows that the optical fiber has a transmittance of at least 75% at a wavelength of 214 nanometers, a transmittance of at least 85% at a wavelength of 229 nanometers and a transmittance of at least 90% at a wavelength range of 240 to 400 nanometers. As described above, the deuterium lamp can be constant and can have an output power that varies depending on the diameter of the core fiber.

Thus, optical loss due to irradiation is greatly reduced in optical fibers manufactured in accordance with the method of the present invention.

FIG. 12 shows solarization measurements for an optical fiber manufactured in accordance with the method of the present invention after the fiber was stored one year two months at room temperature and after such period irradiated with the Deuterium lamp. Thus, in FIG. 12 solarization measurements after four hours of UV irradiation are represented by line 54. In FIG. 12 solarization measurement before UV irradiation are represented by line 50. Line 54 shows that the optical fiber has practically the same transmittance as presented in FIG. 7. Such result demonstrates the long time stability for the fiber manufactured in accordance with the method of the present invention.

Figure 8:
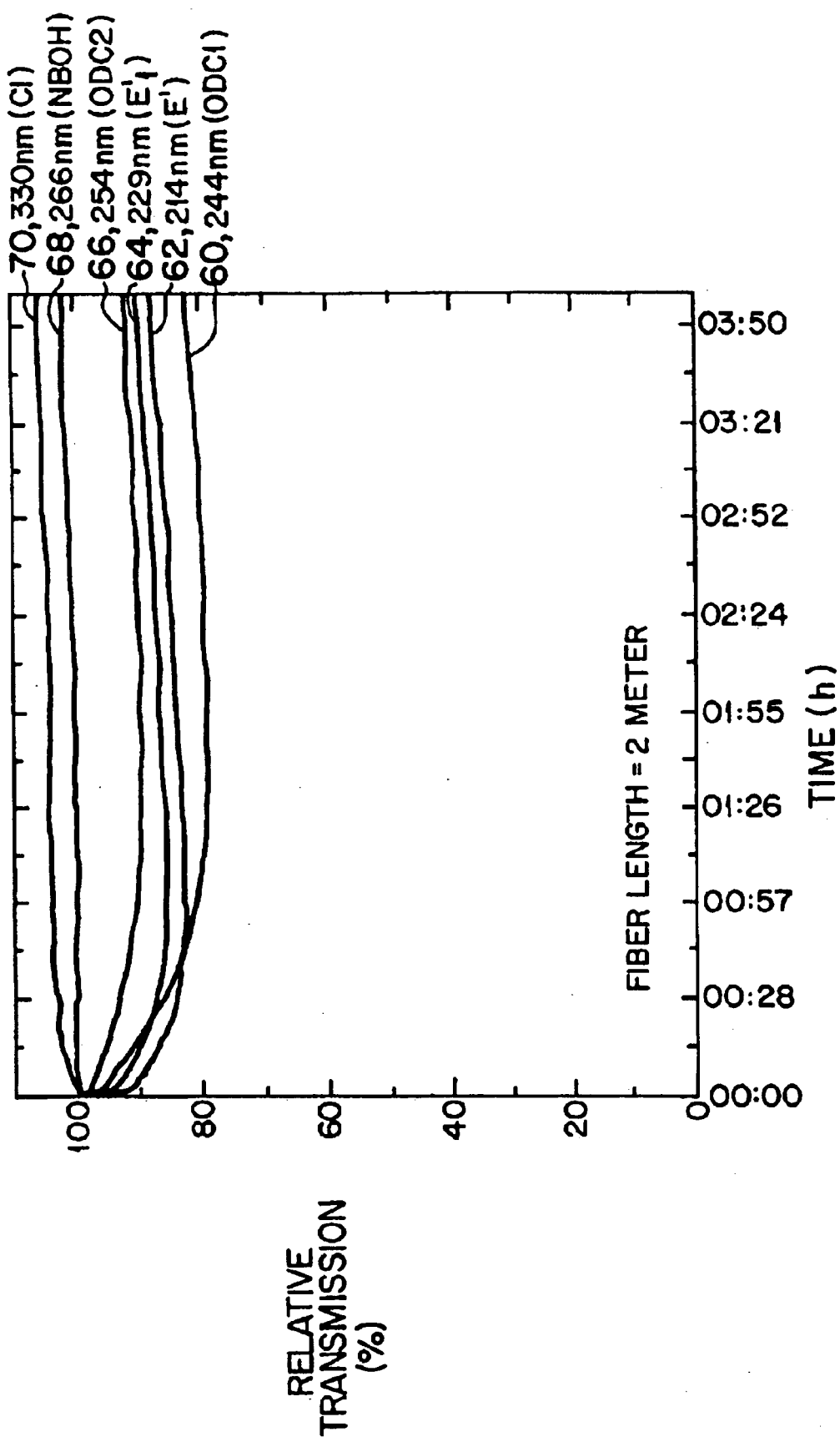
FIG. 8 is a graphical representation of relative transmission loss as a percentage versus time that an optical fiber manufactured in accordance with the method of FIG. 3 and thermally treated.
Figure 13:
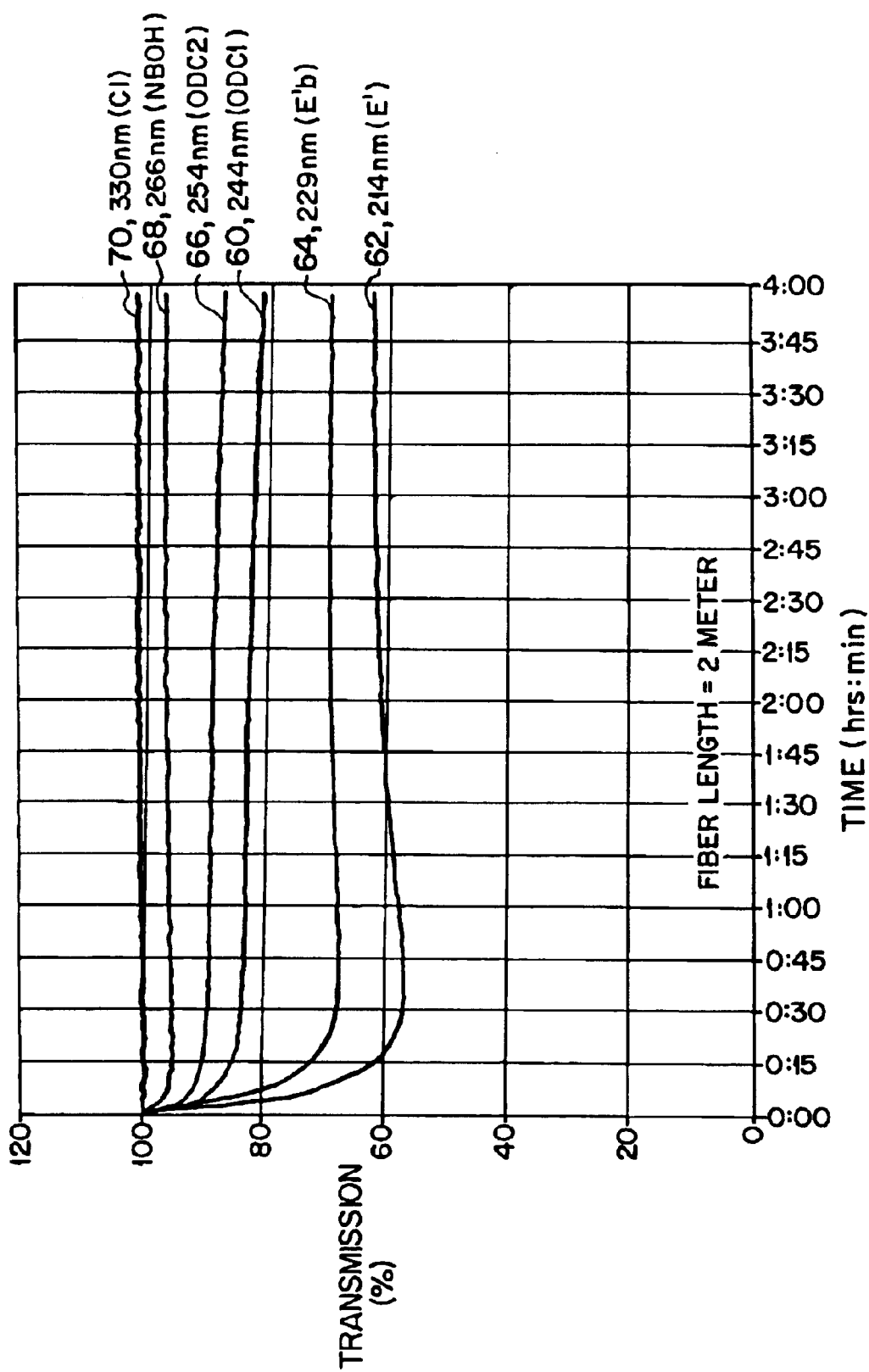
FIG. 13 is a graphical representation of relative transmission loss as a percentage versus time in an optical fiber manufactured in accordance with the method of FIG. 3 is irradiated. Measurement after one year two months after manufacture.

FIGS. 8 and 13 show relative transmission loss as a percentage versus time that the optical fiber was irradiated. Line 62 represents transmission loss at 214 nanometers attributed to the defect E' in the fiber and line 64 represents transmission loss at 229 nanometers attributed to the defect $E_1$' in the fiber. Line 60 represents transmission loss at 244 nanometers attributed to the (ODC1) in the fiber and line 66 represents transmission loss at 254 nanometers attributed to the (ODC2) in the fiber. Line 68 represents transmission loss at 266 nanometers attributed to the non-bridge oxygen hole (NBOH) and line 70 represents transmission loss at 330 nanometers attributed to the chlorine (Cl) amount in the fiber.

Thus, FIG. 8 shows transmissions losses, which are determined by measuring the absorption spectrum of the fiber over a wavelength region of interest. When the optical fiber (having a length of two meter, for example) is irradiated at wavelengths of 190 to 400 nanometers for a predetermined period of time, as shown in FIG. 8, the optical fiber has a transmittance of at least 75–90% of a transmittance of the fiber prior to being irradiated.

FIG. 13 shows transmission losses, which are determined by measuring the absorption spectrum of the fiber over the wavelength region of interest. When the optical fiber (having a length of two meter, for example) was stored one year two months and irradiated at wavelength of 190 nm to 400 nm for a predetermined period of time, as shown in FIG. 13, the optical fiber has a transmittance of at least 60% of a transmittance of the fiber prior to being irradiated.

Figure 9:
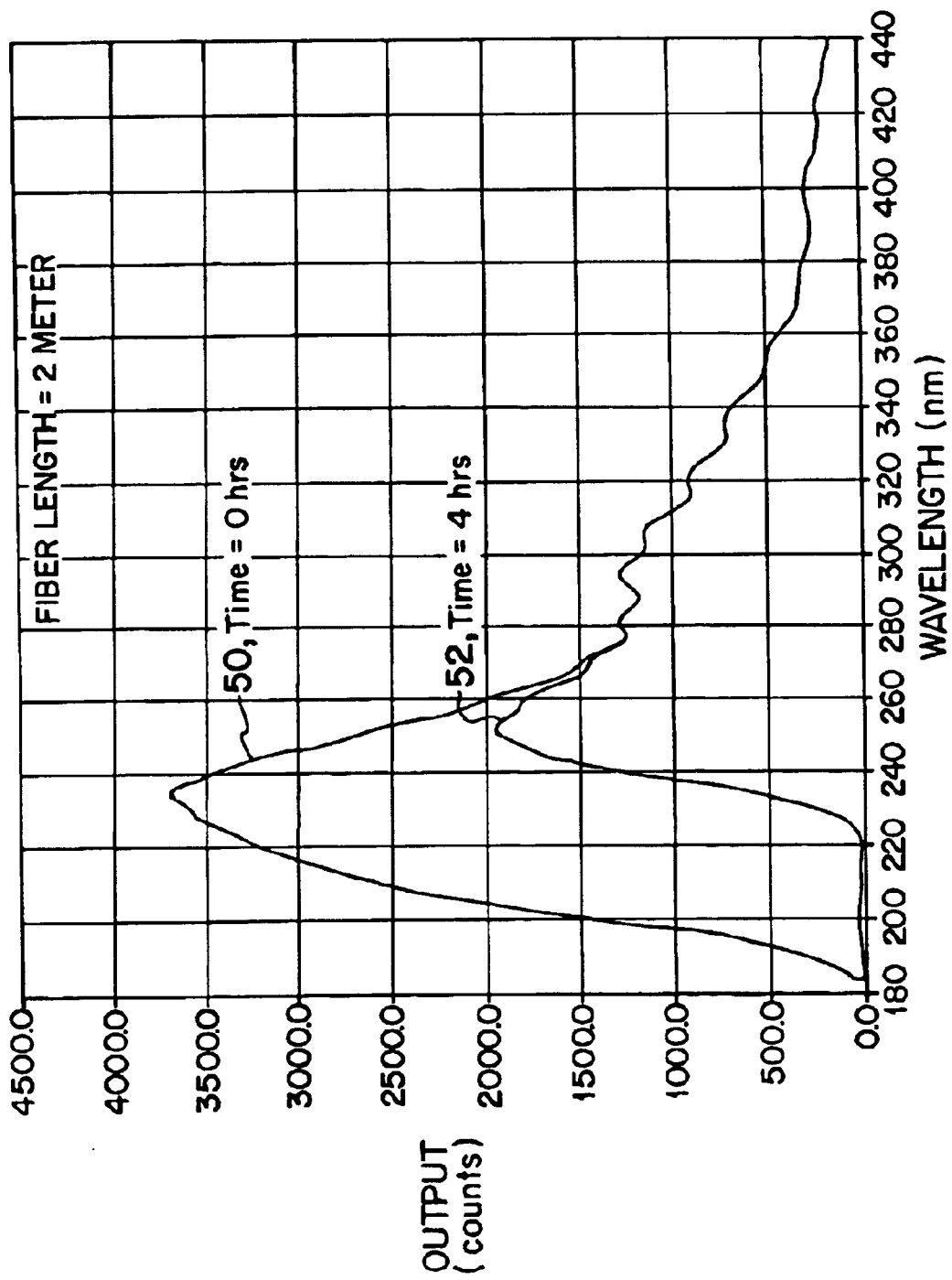
FIG. 9 is a graphical representation of solarization measurements in a standard high OH optical fiber (OH content 400 to 1200 ppm, fluorine doped cladding) initial as drawn fiber not subjected to methods of FIG. 3.
Figure 10:
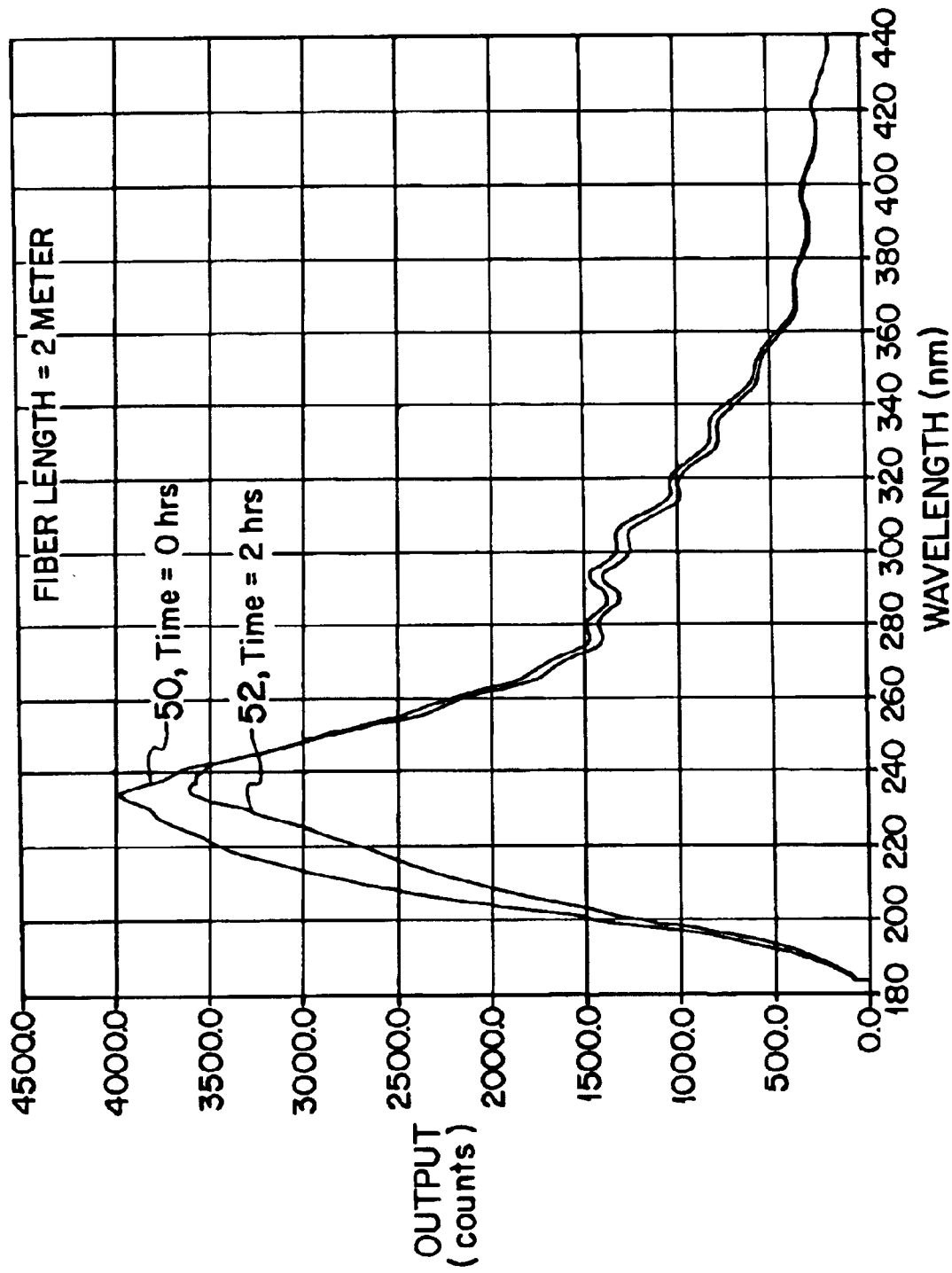
FIG. 10 is a graphical representation of solarization measurements in a standard high OH fiber (OH content 400 to 1200 ppm, fluorine doped cladding) manufactured in accordance with the method of FIG. 3.
Figure 11:
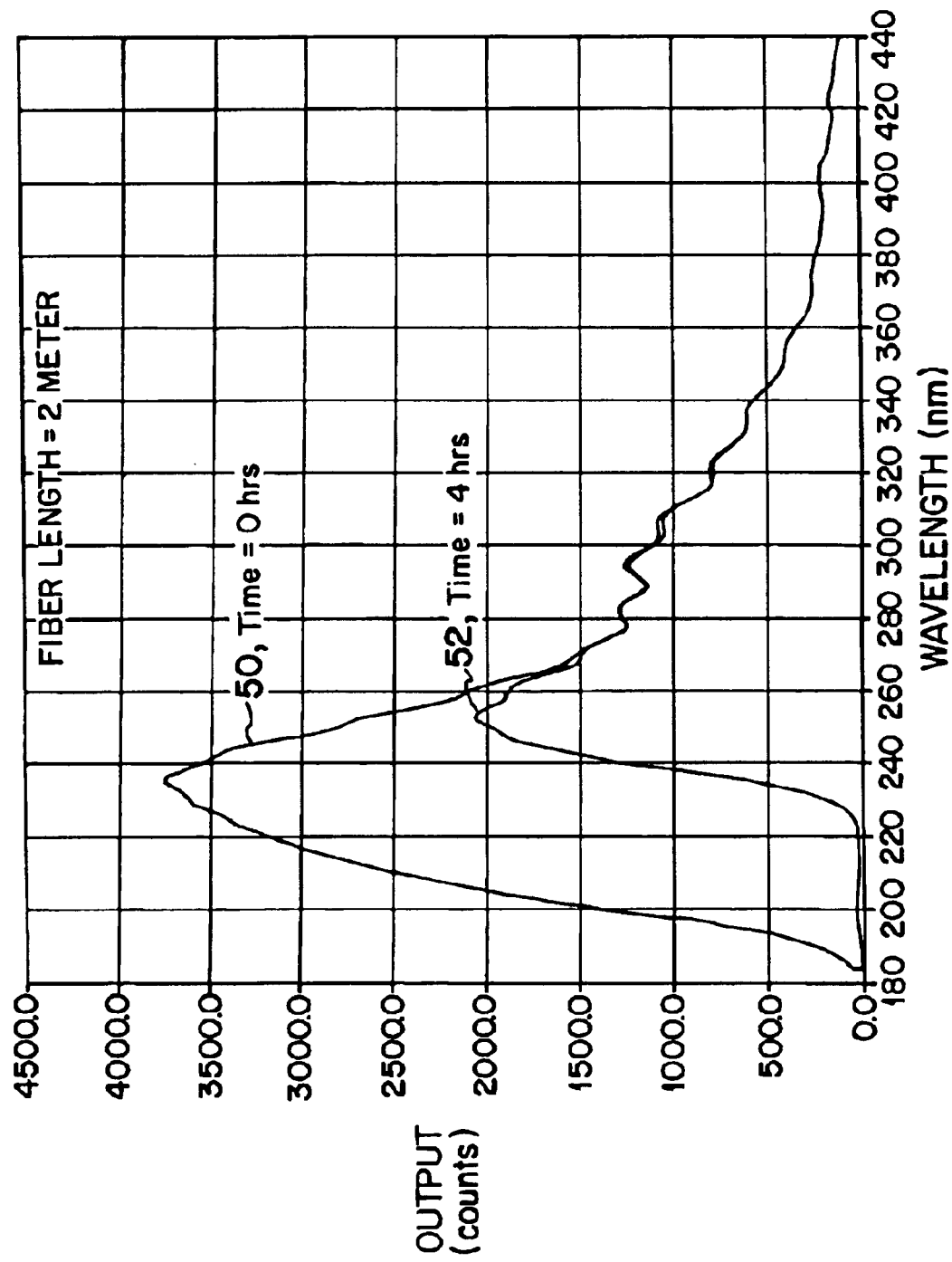
FIG. 11 is a graphical representation of solarization measurements in a high OH fiber (OH content 400 to 1200 ppm, fluorine doped cladding) manufactured in accordance with the method of FIG. 3 and thermally treated.

FIGS. 9, 10 and 11 show solarization measurements for an high OH optical fiber (OH content 400 to 1200 ppm, fluorine doped cladding) as a comparison with the fiber manufactured in accordance with the method of the present invention. The testing results preformed as described in paragraph [0067]. Similar results have been obtained for the case of hydrogen treatment of high OH fiber without pre-irradiation at low (less than 200 degree Celsius) temperatures and pressures 10 to 200 atmospheres (see references).

In FIG. 9 the solarization measurement of the high OH optical fiber (OH content 400 to 1200 ppm, fluorine doped cladding) before irradiation are represented by line 50. In FIG. 9, the solarization measurements after four hours of UV irradiation are represented by line 52. This fiber was not thermally treated to see effects of the time degradation test.

FIG. 10 shows solarization measurements for high OH optical fiber (OH content 400 to 1200 ppm, fluorine doped cladding) manufactured in accordance with the method of present invention. In FIG. 10 solarization measurement of high OH optical fiber before UV irradiation are represented by line 50, with solarization measurement after four hours of UV irradiation are represented by line 52.

FIG. 11 shows solarization measurements after the high OH optical fiber (OH content 400 to 1200 ppm, fluorine doped cladding) manufactured in accordance with the method of present invention was thermally treated at 100 degrees Celsius for 100 hours and after such treatment irradiation with the Deuterium lamp. Thus, in FIG. 11 the solarization measurements before UV irradiation are represented by line 50. The solarization after four hours of UV irradiation is represented by line 52. Line 52 shows that the high OH optical fiber has a transmittance of approximately 0% from wavelength 190 nm to 220 nm. Demonstrating the lack of UV transmittance stability in the high OH fiber versus the low OH fiber of FIG. 7 and 12 manufactured in accordance with the method of present invention.

Conceptually, the embodiments of the invention implement low OH fiber with less than 10 ppm OH-groups and chlorine in the amount of 0 to 1000 ppm for hydrogen treatment in conditions (e.g., pressures, temperatures and treatment time) where the intrinsic and impurity defects of the fiber effectively interact with hydrogen and substantially transform into the radiation-resistance hydrogen-containing centers. Thus, the optical components, e.g., optical fibers, provided by embodiments of the invention or manufactured in accordance with methods of the invention have high radiation resistance to UV and gamma radiation and have the low optical losses in the wide spectral region from 180 nanometers up to 2200 nanometers.

The foregoing illustrated embodiments have been provided to illustrate the structural and functional principles of the present invention and are not intended to be limiting. The principles of the present invention are intended to encompass any and all additional changes, alterations and/or substitutions within the spirit and scope of the present disclosure.

What is claimed is:

1. An optical component comprising:
    a core including a high-purity silica glass which contains OH-groups in the amount of about 0.1 to about 10.0 ppm and chlorine in the amount of less than about 1000 ppm and
    a cladding surrounding the core and including a high-purity silica glass which contains fluorine and having a refractive index less than a refractive index of the core,
    the optical component being treated by immersion in a hydrogen gas atmosphere at a predetermined pressure, at a predetermined temperature and for a predetermined time period such that intrinsic and impurity defects are destroyed.

2. An optical component as recited in claim 1, comprising a plurality of said cores and respective claddings surrounding each core to form a fiber bundle.

3. A method of making an optical component, the method comprising:
    providing a preform having a content of OH-groups in the amount of about 0.1 to about 10.0 ppm and a content of chlorine in the amount of less than about 1000 ppm;
    drawing the preform to elongate it to form an optical component from the preform; and
    immersing the optical component in a hydrogen gas atmosphere at a predetermined pressure and at a predetermined temperature, the optical component being immersed in the hydrogen gas atmosphere for a predetermined time period sufficient to destroy intrinsic and impurity defects of the optical component.

4. A method as recited in claim 3, further comprising coating the optical component with a polymer.

5. A method as recited in claim 4, wherein the polymer is polyimide.

6. A method as recited in claim 3, wherein the predetermined pressure is about 10 to about 200 atmospheres.

7. A method as recited in claim 3, wherein the predetermined temperature is about 200 to about 450 degrees Celsius.

8. A method as recited in claim 3, wherein the predetermined time period is a function of a diameter of the optical component.

9. A method as recited in claim 3, wherein the optical component exhibits a stable high radiation resistance to ultraviolet and gamma radiation in an ultraviolet spectral region, a visible light spectral region and a near infrared spectral region after being immersed in the hydrogen atmosphere.

10. A method as recited in claim 3, wherein the optical component is useful in an ultraviolet spectral region, a visible light spectral region and a near infrared spectral region with minimal optical losses.

11. A method as recited in claim 3, wherein the optical component is useful in ultraviolet and near infrared transmission with minimal losses in the ultraviolet spectral region.

12. An optical component manufactured by the method as recited in claim 3.

13. The optical component as recited in claim 12, wherein the optical component comprises one of the group consisting of an optical fiber, an optical fiber probe and an optical fiber bundle comprising a plurality of optical fibers.

14. A method as recited in claim 3, wherein the optical component comprises:
    a core including a high-purity silica glass which contains OH-groups in the amount of about 0.1 to about 10.0 ppm and chlorine in the amount of less than about 1000 ppm and
    a cladding surrounding the core and including a high-purity silica glass which contains fluorine and having a refractive index less than a refractive index of the core.

15. A method as recited in claim 14, wherein the optical component further comprises a plurality of said cores and respective claddings surrounding each core to form a fiber bundle.

16. A method as recited in claim 14, wherein when the predetermined pressure is 40 atmospheres and the predetermined temperature is 350 degrees Celsius, the core has a diameter of $200*(x)$ microns and the predetermined time period is $5*(x)$ hours, wherein x represents a numerical value greater than or equal to 1.

17. A method as recited in claim 14, wherein the predetermined pressure is 40 atmospheres, the predetermined temperature is 350 degrees Celsius, the core has a diameter of 200 microns and the predetermined time period is 5 hours.

18. A method as recited in claim 14, wherein the predetermined pressure is 40 atmospheres, the predetermined temperature is 350 degrees Celsius, the core has a diameter of 400 microns and the predetermined time period is 10 hours.

19. A method as recited in claim 14, wherein the predetermined pressure is 40 atmospheres, the predetermined temperature is 350 degrees Celsius, the core has a diameter of 600 microns and the predetermined time period is 15 hours.

20. An optical component comprising:
    a core including a high-purity silica glass which contains OH-groups in the amount of about 0.1 to about 10.0 ppm and chlorine in the amount of less than about 1000 ppm; and
    a cladding surrounding the core and including a high-purity silica glass which contains fluorine and having a refractive index less than a refractive index of the core,
    wherein prior to being used to transmit radiation, the optical component is treated by immersion in a hydrogen gas atmosphere at a predetermined pressure, at a predetermined temperature and for a predetermined time period such that intrinsic and impurity defects are destroyed.

21. An optical component as recited in claim 20, wherein the impurity defects are chlorine related defects.

* * * * *